Jan. 10, 1967 W. KÄNZIG 3,296,825

SOLID STATE ELECTRONIC DEVICE AND METHOD

Filed Nov. 2, 1964

Inventor:
Werner Känzig,
by [signature]
His Attorney.

United States Patent Office 3,296,825

Patented Jan. 10, 1967

3,296,825
SOLID STATE ELECTRONIC DEVICE AND METHOD

Werner Känzig, Zurich, Switzerland, assignor to General Electric Company, a corporation of New York Filed Nov. 2, 1964, Ser. No. 408,298
9 Claims. (Cl. 62—514)

The present invention relates generally to the field of paraelectricity and is more particularly concerned with new devices exhibiting paraelectric properties and effects at temperature below 25° K. and with a novel refrigeration method which employs this device to accomplish cooling paraelectrically. It is further concerned with the use of this device as a voltage-dependent capacitor at cryogenic temperatures.

As operations in extremely low-temperature environments have in the last few years become more commonplace, the need for means for performing new tasks and for better performing old ones under such conditions has become generally recognized. Specifically, those skilled in the art are well aware of the shortcomings of heretofore available cryogenic refrigeration devices and systems. Likewise, they have for some time recognized that voltage-dependent capacitors and devices such as parametric amplifiers which are operable at high voltages in the temperature ranges of liquid hydrogen and liquid helium could become important in the exploitation of technological opportunities peculiar to this extreme environment.

By virtue of the present invention, these needs can, for the first time to my knowledge, be fully met. Thus, for example, cooling or refrigeration can be accomplished without resort to paramagnetic means at temperatures below 25° K. and down at least as low as 0.1° K. through the use of this invention and the discoveries upon which it is predicated. Likewise, this invention enables the construction and operation of a voltage-dependent capacitor useful, for example, for electrical tuning, electrical modulation and parametric amplification in the cryogenic temperature range.

This invention is based upon my discovery that certain ions in certain alkali metal halide crystals will behave essentially like free electric dipoles at temperatures below 25° K. and can therefore be aligned by the application of an electric field to the crystals. I further discovered that the dielectric constant of these crystals increases with decreasing temperature in the cryogenic temperature range. Still further, I have found that when the electric field is diminished or removed so that the thus-aligned dipoles relax into disarray, the crystals will cool. The lower limit of this cooling effect, I have further discovered, depends upon the concentration of the dipole-like ions. Also, I have found that the amount of entropy that can be removed depends upon this ion concentration factor. In general, the lower the concentration of these ions, the lower the ultimate temperature that can be attained. By contrast, the greater the concentration of these ions, the greater the amount of entropy that can be removed through the practice of this invention.

Those skilled in the art will gain a better and further understanding from the detailed disclosure set forth herein taken in conjunction with the drawings accompanying and forming a part of this specification, in which.

Broadly and generally defined, the electronic device of this invention comprises an alkali metal halide body containing hydroxyl ions and means for maintaining that body at a temperature below 25° K. and means for subjecting the body while at that temperature to an electric field. Preferably, the body is a crystal and it is selected from the group consisting of potassium chloride, potassium bromide, potassium iodide, sodium chloride, sodium bromide and sodium iodide. Suitably, instead of hydroxyl ions, the crystal or body of alkali metal halide may contain deuteroxyl ions or a mixture of deuteroxyl and hydroxyl ions. Further, the crystal will be provided with electrodes which are physically and electrically connected to it and will contain a quantity of hydroxyl or deuteroxyl or deuteroxyl and hydroxyl ions combined of the order of more than $10^{17}$ cm.$^{-3}$.

In its method aspect, the invention generally described comprises the steps of placing in thermal contact with a mass to be cooled an alkali metal halide body containing hydroxyl ions, subjecing that body to electric field, removing from the body heat produced by the application of the electric field to the body, then thermally connecting the body to the mass to be paraelectrically cooled, and then reducing the electric field and cooling the body and the mass, and repeatedly subjecting the body to an electric field and removing resulting heat from the body and repeatedly reducing the field to remove heat from the mass in successive increments. In preferred practice, as will be subsequently described in detail, the alkali metal halide body or crystal is connected and disconnected to an electric power source at a frequency less than the relaxation frequency limit of the hydroxyl or deuteroxyl ion dipoles so that a very substantial cooling effect is accomplished in a relatively short time through a large number of comparatively small incremental cooling events. This is done within the limit imposed by the fact that the lowest temperature which can be reached with a single stage device is the temperature to which the doped alkali halide body can be cooled in a single adiabatic de-electrification with no additional mass attached.

Figures 1, 2, 3:
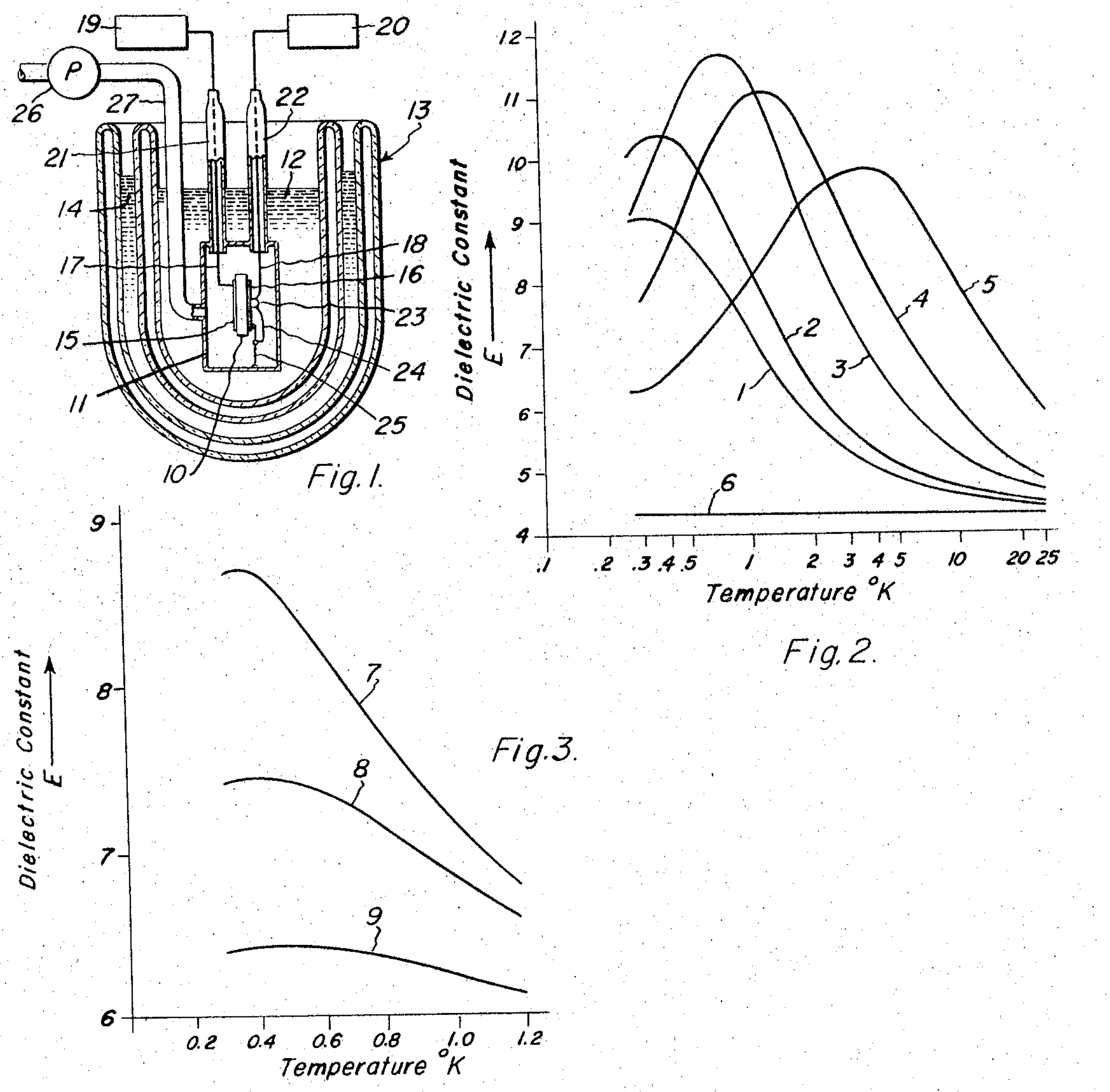
FIG. 1 is a schematic view of an apparatus embodying this invention in preferred form and showing a crystal fitted with electrodes connected by leads to a high voltage supply and a switch for carrying out the method of this invention.
FIG. 2 is a chart bearing curves depicting the variation of dielectric constant of five hydroxyl ion-doped potassium chloride crystals over a temperature range of from about 0.3° K. to 25° K.
FIG. 3 is a chart bearing curves illustrating the variation of the dielectric constant with bias voltage in one of the hydroxyl ion-doped potassium chloride crystals of FIG. 2.

In the apparatus of FIG. 1, a potassium chloride crystal 10 is disposed in closed metal container 11 submerged in a body of liquid helium ($He^4$) 12 at 1.2° K. in a Dewar flask 13 between the inner and outer walls of which a body of liquid nitrogen 14 is provided for thermal insulation purposes. Crystal 10 is in the form of a polished flat plate which is provided on each side with silver-manganese electrodes 15 and 16 connected, respectively, by wires 17 and 18 to a high-voltage power source indicated at 19 and to a Wheatstone bridge indicated at 20. Wires 17 and 18 are in thermal contact with bath 12 through the walls of tubes 21 and 22 of container 11. Radio carbon resistor 23 is secured to electrode 16, and the resistor and this electrode are grounded by wires 24 and 25 connected to container 11.

Container 11 is connected to vacuum pump 26 by tube 27 so that the contents of the container can be subjected to predetermined vacuum conditions during operation of the apparatus as described in detail in the actual experiment set out below.

Figure 4:
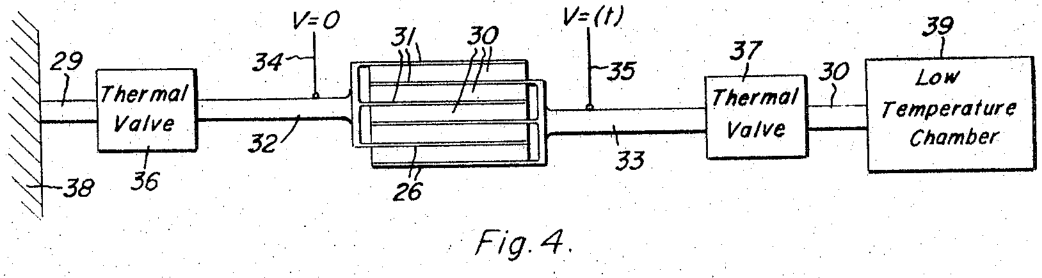
FIG. 4 is a schematic diagram of a refrigeration apparatus embodying the present invention in a preferred form.

The use of this invention for refrigeration purposes is illustrated in FIG. 4 wherein thermal valves are used to effect the transfer of heat from one point to another as a plurality of crystals of hydroxyl ion-doped potassium chloride are paraelectrically cooled.

Instead of the single crystal 10, the FIG. 4 apparatus incorporates a stack of hydroxyl ion-doped potassium chloride crystals 30 which are connected to an electric power source such as source 19 of FIG. 1 (not shown) by means of electrodes 31 in the form of copper foils vapor-deposited directly on crystals 30 and disposed between them in the stack. These electrodes are in turn electrically connected to thermally-conducting lead strips 32 and 33. Strips 32 and 33 are connected then to conventional battery means by manganin wires 34 and 35, respectively, and switch means of suitable design such as switch 20 is provided to connect the battery means to crystals 30. Manganin wires are preferred in this use because of their low thermal conductivity but many other kinds of wires may be used since virtually no current is carried. Strips 32 and 33 are thermally connected through thermal valves 36 and 37, respectively, to a bath indicated at 38 where heat is delivered by the apparatus and to low temperature chamber 39 from which heat is extracted by synchronized actuation and operation of the switch means and thermal valves 36 and 37.

Valves 36 and 37 each comprise a small magnet disposed around strip 32 or strip 33. When the field of this magnet is zero, the thermal conduction of the strip is at a minimum, and when the field is greater than the critical field of the strip, the thermal conduction of the strip is at a maximum.

In operation of the FIG. 4 apparatus, the entire system is at low temperature except bath 38 and, except for the bath, is subjected to a high vacuum for thermal isolation. Starting with all parts of the system at the temperature of bath 38, valve 37 is opened, i.e., made thermally non-conductive and at the same time thermal valve 36 is closed. Switch means for powering the crystal stack is closed with the result that voltage is applied to the crystals which will try to heat up above the temperature of bath 38 and heat will be conducted to the bath through strip 32. When the system has reached the temperature of bath 38, thermal valve 36 is opened and thermal valve 37 is closed and the crystal stack is disconnected from the battery means. In a short time interval, low temperature chamber 39 and the crystal stack will cool to a temperature slightly below the temperature of bath 38. At this time, thermal valve 37 is opened again, thermal valve 36 is closed and the stack is again connected to the battery means and the crystal stack is thereby heated above the bath temperature. Once again, when the crystal stack reaches approximately the temperature of bath 38 and thermal valve 36 is opened, the crystal stack is disconnected from the battery means and thermal valve 37 is closed. The crystal stack is cooled and by virtue of heat transfer through strip 33 heat is removed from low temperature chamber 39 through valve 37. This operation is repeated a number of times, thus pumping down the temperature and heat content of chamber 39 to the desired level.

Crystals 30, like crystal 10, contain substantial numbers of hydroxyl ions and are prepared in accordance with the conventional practice in the art of doping potassium chloride and similar alkali metal halides. In a typical operation of this kind, potassium chloride is fused and a small amount of potassium hydroxide is added to the melt from which crystals are produced in a conventional manner. Six different crystals of potassium chloride containing varying amounts of hydroxyl ions are represented by six curves on the chart of FIG. 2. These six curves bear numbers corresponding to the sample numbers set out in the following table:

TABLE.—CHARACTERISTICS OF THE VARIOUS SAMPLES

[The sample numbers correspond with FIG. 2]

| Sample No. | Concentration of (OH)- in $10^{18}$ cm.$^{-3}$ | | Carbonate Content in Arbitrary Units | Calc. Curie Temp. (° K.) | Temp. at Maximum $\epsilon$ |
|---|---|---|---|---|---|
| | Chemical ($N_{chem}$) | Dielectric ($N_d$) | | | |
| 1 | 5 | 6.09 | <0.001 | 0.432 | 0.32 |
| 2 | 11 | 8.17 | .03 | .580 | .385 |
| 3 | 67 | 18.3 | 1.9 | 1.30 | .74 |
| 4 | 36 | 28.6 | 0.13 | 2.03 | 1.2 |
| 5 [1] | 140 | 72.5 | .8 | 5.15 | 4 |
| 6 | Zone-refined (ultrapure). | ---------- | ---------- | ⟪0.003 | ⟪0.29 |

[1] This sample was doped with $BaCl_2$, in addition to KOH.

In the chart of FIG. 2, dielectric constant is plotted against temperature and it is seen that the control sample represented by curve 6, which is a zone refined potassium chloride crystal, has a dielectric constant substantially independent of temperature up to 25° K. The dielectric constant of Sample 4, however, increases with decreasing temperature through a maximum near 1° K. and then decreases rapidly again. This same pattern applies generally to the other hydroxyl ion-doped Samples 1, 2, 3 and 5.

It will be noted that the values given in the table for the chemical concentration of hydroxyl ion in the several samples do not consistently correlate with the curves of FIG. 2. By measuring the dielectric constant of the FIG. 2 samples as a function of temperature and analyzing the results I have determined, the concentration of hydroxyl ion which can be aligned by the application of an electric field, that is, the effective dipole which is designated $N_d$ in the table. The discrepancies in the chemical concentration figures were found to arise from the presence of divalent ions such as barium and carbonate ions. The ratio of $N_d/N_{chem}$ drops with increasing content of divalent impurities such as barium and carbonate, indicating that the random electric fields due to such impurities immobilize a fraction of the hydroxyl ion dipoles in the temperature range considered.

In the chart of FIG. 3, the effect of bias voltage on the dielectric constant of materials useful in accordance with this invention is shown for three different values of bias voltage applied to a single crystal of hydroxyl ion-doped potassium chloride. Thus, the crystal of curve 1 of FIG. 2 was employed in three tests in which curve 7 of FIG. 3 represents the control where the bias voltage was zero. In the case of curve 8, the sample was subjected to a bias voltage of 3.31 kv./cm. while in the case of curve 9, Sample 1 was subjected to a bias voltage of 8.28 kv./cm. The loss angle characteristic of the Sample 1 potassium chloride crystal and others of this type can likewise be altered by applying a bias voltage to it.

For the purposes of further particularly describing the details of the present invention, the following illustrative but not limiting example of an actual experiment is offered:

*Example*

A crystal of hydroxyl doped potassium chloride was heated and cooled with the adiabatic application and removal of an electric field. No thermal switches were used in this simple experiment. The apparatus of FIG. 1 was employed and the sample was Sample No. 4 of FIG. 2 a KCl crystal containing roughly $29 \times 10^{18}$ cm.$^{-3}$ effective $OH^-$ ions. It was in the form of a cleaved and polished flat plate 0.071 cm. thick and roughly 1.9 cm. long by 1.4 cm. wide. The thickness was along the [100] direction of the crystal. Onto each side of the crystal was vacuum-deposited a silver-manganese electrode 1.78 cm. by 1.18 cm. (the starting material was $Ag_{0.8}Mn_{0.2}$).

Glued to these electrodes with solvent-thinned GE 7031 varnish were 0.005 inch thick lead foils cut with pigtails for electrical connections. The lead foils thus were in thermal and electrical contact with the sample and, together with the deposited electrodes and sample, formed a simple capacitor. Glued with Apiezon N vacuum grease to one lead foil and thus to the sample was a 110Ω, ½ watt, Allen-Bradley radio-carbon resistor which was used as a resistance thermometer (previously calibrated). The assembly was warmed sufficiently to allow the vacuum grease to flow. The necessary leads (.003 inch diameter manganin wires) were connected to the lead foil pigtails (i.e., to the capacitor plates) and to the resistor thermometer. The sample assembly was supported physically in a vacuum chamber by these thin wires, which by their small diameters and low thermal conductances effectively isolated the sample thermally from the 1.2° K. liquid helium bath which surrounded the vacuum chamber. In the initial cool-down, helium exchange gas was used. This gas was then pumped out to obtain thermal isolation.

In the experiment, the resistance of the thermometer, and thus the temperature, was recorded as a function of time as electric fields of various strengths and polarities were slowly (1 to 5 seconds time constant) raised and lowered. I used a fluke commercial high voltage supply followed by a R-C filter.

As an example of the results obtained I have:

For the application, or removal, of 1460 volts at 3.37° K. a heating, or cooling, respectively, of roughly 0.011° K. was obtained. The temperature change was reversible, indicating negligible spurious heating or dissipation. In addition, the heating and cooling were independent of polarity, as expected, indicating the lack of spurious instrumentation effects.

The heat capacity of the sample, foils, thermometer, and other parts was measured directly by applying through the resistor a known amount of heat and observing the resulting temperature change. From the heat capacity and the above change in temperature upon the application or removal of the electric field, it was possible to determine the entropy change in the dipole system for 1460 volts and 3.37° K. The change in entropy found agreed within 20 percent with that predicted by the paraelectric theory of $OH^-$ dipoles in KCl. This is agreement within experimental error.

Having thus described this invention in such full, clear, concise, and exact terms as to enable any person skilled in the art to which it apertains to make and use the same, and having set forth the best mode contemplated of carrying out this invention, I state that the subject matter which I regard as being my invention is particularly pointed out and distinctly claimed in what is claimed, it being understood that equivalents or modifications of, or substitutions for, part of the specifically-described embodiments of the invention may be made without departing from the scope of the invention as set forth in what is claimed.

What I claim as new and desire to secure by Letters Patent of the United States is:

1. An electronic device comprising an alkali metal halide body containing hydroxyl ions, means for maintaining the said body at a temperature below 25° K., and means for subjecting the body while at a temperature below 25° K. to an electric field.

2. An electronic device comprising a crystal containing hydroxyl ions and selected from the group consisting of potassium chloride, potassium bromide, potassium iodide, sodium chloride, sodium bromide and sodium iodide, means for maintaining the said crystal at a temperature below 25° K., and means for subjecting the crystal while at a temperature below 25° K. to an electric field.

3. An electronic device comprising an alkali metal halide body containing ions selected from the group consisting of hydroxyl ions and deuteroxyl ions, means for maintaining the said body at a temperature below 25° K., and means for subjecting the body while at a temperature below 25° K. to an electric field.

4. An electronic device comprising an alkali metal halide body containing hydroxyl ions, means for maintaining the said body at a temperature below 25° K., and means comprising electrodes physically and electrically connected to the body for subjecting the body while at a temperature below 25° K. to an electric field.

5. An electronic device comprising a potassium chloride crystal containing hydroxyl ions in an amount greater than about $10^{17}$ cm.$^{-3}$, means for maintaining the said crystal at a temperature below 25° K., and two electrodes attached to the crystal at spaced locations for subjecting the body while at a temperature below 25° K. to an electric field.

6. An electronic device comprising a potassium iodide crystal containing hydroxyl ions at an amount greater than about $10^{17}$ cm.$^{-3}$, means for maintaining the said body at a temperature below 25° K., and electrode for subjecting the body while at a temperature below 25° K. to an electric field.

7. The cyclic refrigeration method of para-electrically cooling a mass which comprises the steps of subjecting an alkali metal halide body containing hydroxyl ions to an electric field, removing from the body heat produced by the application of the electric field to said body, then thermally connecting the said body to the mass to be cooled, and thereafter reducing the electric field to which the said body is subjected and thereby cooling the body and the mass in thermal contact therewith, and repeatedly subjecting the body to an electric field and removing resulting heat from the body and repeatedly reducing the electric field to remove heat from the mass in successive increments.

8. The cyclic refrigeration method of para-electrically cooling a mass which comprises the steps of subjecting an hydroxyl ion-doped potassium chloride crystal to an electric field, removing from the crystal heat produced by the application of the electric field to crystal, then thermally connecting the crystal to the mass to be cooled, and thereafter reducing the electric field to which the crystal is subjected and thereby cooling the crystal and the mass in thermal contact therewith, and repeatedly subjecting the crystal to an electric field and removing the resulting heat from the crystal and reducing the electric field to remove heat from the mass in repetitions of the cycle.

9. The cyclic refrigeration method of para-electrically cooling a mass by means of a crystal containing hydroxyl ions and selected from the group consisting of potassium chloride, potassium bromide, potassium iodide, sodium chloride, sodium bromide and sodium iodide, which comprises the steps of connecting the crystal in an electric circuit to subject said crystal to an electric field, removing from the crystal much of the heat produced by the application of the electric field to the crystal, then thermally connecting the crystal to the mass to be cooled, interrupting the electric field to which the said crystal is subjected and thereby cooling the crystal and the mass in thermal contact therewith, and repeatedly connecting the crystal to the electric field and largely removing the resulting heat from the crystal and interrupting the electric field applied to the crystal to cool the crystal and remove heat from the said mass in repetitions of the cycle.

References Cited by the Examiner

UNITED STATES PATENTS

| | | | |
|---|---|---|---|
| 2,832,897 | 4/1958 | Buck | 62—514 |
| 2,967,961 | 1/1961 | Heil | 62—514 |
| 3,116,427 | 12/1963 | Giaever | 62—3 |

LLOYD L. KING, *Primary Examiner.*